United States Patent
Lauridsen et al.

(10) Patent No.: US 11,356,902 B2
(45) Date of Patent: Jun. 7, 2022

(54) CONTROL OF HANDOVERS OVER DIFFERENT CONNECTIONS OF A HYBRID ACCESS USER TERMINAL

(71) Applicant: NOKIA TECHNOLOGIES OY, Espoo (FI)

(72) Inventors: Mads Lauridsen, Gistrup (DK); Troels Emil Kolding, Klarup (DK); Jeroen Wigard, Klarup (DK); Guillermo Pocovi, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 29 days.

(21) Appl. No.: 17/054,292

(22) PCT Filed: May 14, 2018

(86) PCT No.: PCT/EP2018/062314
§ 371 (c)(1),
(2) Date: Nov. 10, 2020

(87) PCT Pub. No.: WO2019/219158
PCT Pub. Date: Nov. 21, 2019

(65) Prior Publication Data
US 2021/0250815 A1    Aug. 12, 2021

(51) Int. Cl.
*H04W 36/00* (2009.01)
*H04W 36/08* (2009.01)

(52) U.S. Cl.
CPC .... *H04W 36/0011* (2013.01); *H04W 36/0058* (2018.08); *H04W 36/0069* (2018.08); *H04W 36/08* (2013.01)

(58) Field of Classification Search
CPC ......... H04W 36/0011; H04W 36/0058; H04W 36/0069; H04W 36/08; H04W 36/0005
See application file for complete search history.

(56) References Cited

U.S. PATENT DOCUMENTS

| | | | |
|---|---|---|---|
| 2012/0264434 A1* | 10/2012 | Zou ...................... | H04W 36/14 455/437 |
| 2016/0095034 A1* | 3/2016 | Hampel ................ | H04W 36/14 370/331 |
| 2016/0219474 A1 | 7/2016 | Singh et al. | |

FOREIGN PATENT DOCUMENTS

EP    1 971 164 A1    9/2008

OTHER PUBLICATIONS

International Search Report and Written Opinion dated Oct. 5, 2018 corresponding to International Patent Application No. PCT/EP2018/062314.

* cited by examiner

*Primary Examiner* — Hashim S Bhatti
(74) *Attorney, Agent, or Firm* — Squire Patton Boggs (US) LLP

(57) ABSTRACT

A solution for handover control in communication system is disclosed, the solution comprising controlling (300) more than one wireless interfaces configured to maintain more than one radio connection connecting the apparatus to one or more networks, the more than one radio connection being related to a same service and controlling (302) timing of handovers of the different radio connections to execute non overlapping handovers in time.

16 Claims, 4 Drawing Sheets

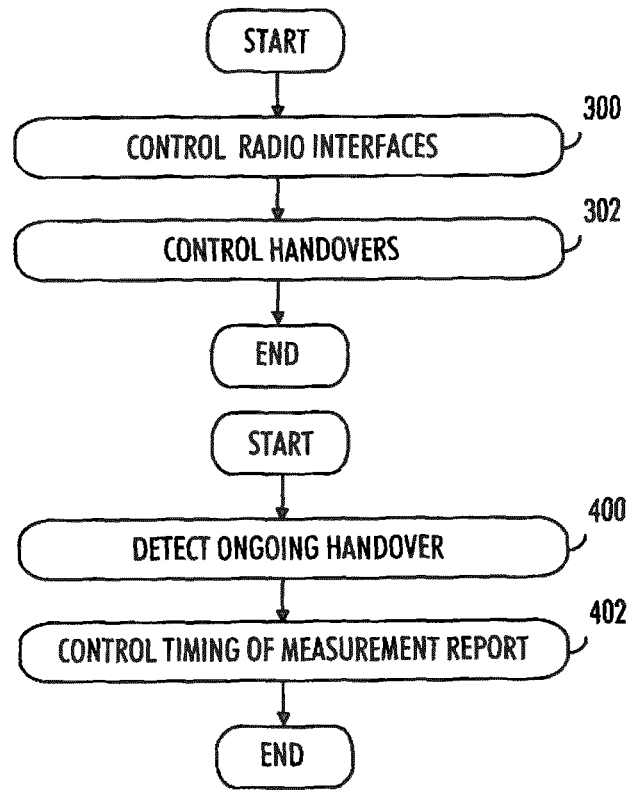
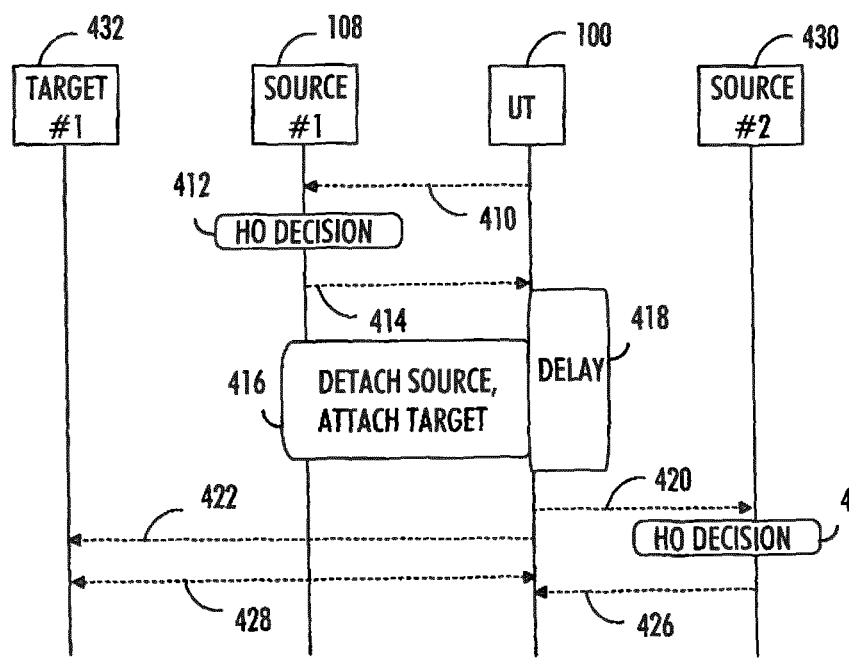

CONTROL OF HANDOVERS OVER DIFFERENT CONNECTIONS OF A HYBRID ACCESS USER TERMINAL

TECHNICAL FIELD

The exemplary and non-limiting embodiments relate to handover control in a communication system.

BACKGROUND

Wireless telecommunication systems are under constant development. There is a constant need for higher data rates and high quality of service. Low latency communication is required in many applications, such as autonomous vehicle applications, for example. Current radio technologies can provide average latencies that fulfil some requirements, but to achieve target latencies for 99,999% at 10-50 ms delay range is currently difficult if not impossible to achieve.

Hybrid Access, where end users are connected using multiple radio connections access technologies at the same time is used for bandwidth boosting, and thus it has some advantage is reducing latency as well. However, especially if end users are moving hybrid access as such may be unable to provide required service quality.

BRIEF DESCRIPTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising at least one processor; at least one memory including computer program code; the at least one memory and the computer program code configured to, with the at least one processor, cause the apparatus at least to perform: control more than one wireless interfaces configured to maintain more than one radio connection connecting the apparatus to one or more networks, the more than one radio connection being related to a same service; control timing of handovers of the different radio connections to execute non overlapping handovers in time.

According to an aspect of the present invention, there is provided a network element comprising at least one processor; at least one memory including computer program code; the at least one memory and the computer program code configured to, with the at least one processor, cause the apparatus at least to perform: detect that a user terminal controls more than one wireless interfaces configured to maintain more than one radio connection, the more than one radio connection being related to a same service; control the handover related messages transmitted to the user terminal to control timing of handovers of the different radio connections to execute non overlapping handovers in time.

According to an aspect of the present invention, there is provided a method in a user terminal, comprising: controlling more than one wireless interfaces configured to maintain more than one radio connection connecting the apparatus to one or more networks, the more than one radio connection being related to a same service; controlling timing of handovers of the different radio connections to execute non overlapping handovers in time.

According to an aspect of the present invention, there is provided a method in a network element controlling a user terminal, comprising detecting that a user terminal controls more than one wireless interfaces configured to maintain more than one radio connection, the more than one radio connection being related to a same service; controlling the handover related messages transmitted to the user terminal to control timing of handovers of the different radio connections to execute non overlapping handovers in time.

According to an aspect of the present invention, there is provided a computer program comprising instructions for causing an apparatus to perform at least the following: control more than one wireless interfaces configured to maintain more than one radio connection connecting the apparatus to one or more networks, the more than one radio connection being related to a same service; control timing of handovers of the different radio connections to execute non overlapping handovers in time.

According to an aspect of the present invention, there is provided a computer program comprising instructions for causing an apparatus to perform at least the following: controlling more than one wireless interfaces configured to maintain more than one radio connection connecting the apparatus to one or more networks, the more than one radio connection being related to a same service; controlling timing of handovers of the different radio connections to execute non overlapping handovers in time.

BRIEF DESCRIPTION OF DRAWINGS

One or more examples of implementations are set forth in more detail in the accompanying drawings and the description below. Other features will be apparent from the description and drawings, and from the claims.

FIGS. 3 and 4A are flowcharts illustrating some examples of embodiments;

FIG. 4B is a signalling chart illustrates an example embodiment;

DETAILED DESCRIPTION OF SOME EMBODIMENTS

The proposed solution may be utilized in various communication systems or a combination of them. Examples of possible systems are a radio access architecture based on long term evolution advanced (LTE Advanced, LTE-A) or new radio (NR, 5G), the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

To achieve low latency required by some services, it has been proposed that user terminals can utilize more than one radio interfaces configured to establish and maintain more than one radio connection connecting the user terminal to one or more networks, where the radio connections are related to the same service. Thus a robust connection may be obtained for the service, because data may be duplicated or otherwise scheduled in an appropriate way across different radio interfaces. The radio connections may be of the same type, i.e cellular connections with the same or different operator, or of different types, such as a cellular connection and a wireless local area network connection, for example.

Figure 1:
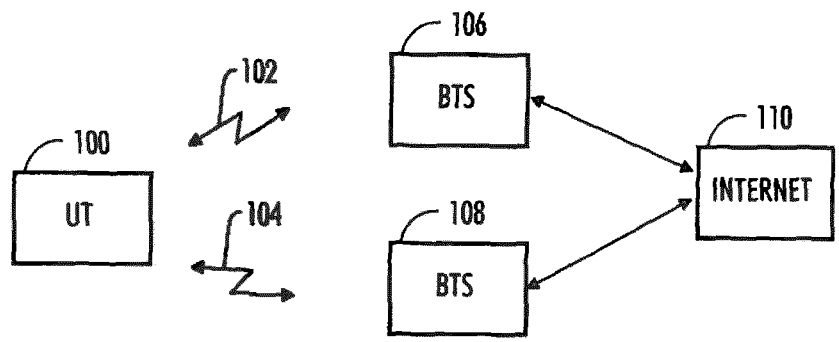
FIG. 1 illustrates an example of hybrid access.

FIG. 1 depicts example of employing hybrid access. In this example, a user terminal 100 is running or utilizing a service with a server 110 in the internet. The user terminal 100 comprises at least two modems configured to establish and maintain radio connections 102, 104 with two base stations or access nodes (such as (e/g) NodeB) 106, 108 providing a cell. The physical link from a user terminal to a (e/g) NodeB is called uplink or reverse link and the physical link from the (e/g) NodeB to the user terminal is called downlink or forward link. It should be appreciated that (e/g) NodeBs or their functionalities may be implemented by using any node, host, server or access point etc. entity suitable for such a usage. It may be noted that the connections of the user terminal may be to a single base station or access node as well.

In the example of FIG. 1, the base stations or access nodes 106, 108 are configured to connect the user terminal 100 to the server 110 via internet. The base stations may belong to a same network of a given operator or they may be of different operators in different networks. The hybrid access connection may also be established to a server that is located within the operators access network using two modems from the same operator (e.g. two SIM cards from same operator), e.g. at a mobile edge cloud node location. As such the connection to the server is not routed via Internet but kept within the operators own network. The connections shown in FIG. 1 are logical connections; the actual physical connections may be different. It is apparent to a person skilled in the art that communication systems typically comprises also other functions and structures than those shown in FIG. 1. For example, a communications system typically comprises more than one (e/g) NodeB in which case the (e/g) NodeBs may also be configured to communicate with one another over links, wired or wireless, designed for the purpose. These links may be used for data and signalling purposes. The (e/g) NodeB is a computing device configured to control the radio resources of communication system it is coupled to. The NodeB may be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB may further be connected to core network (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. These network units are not shown in FIG. 1 for simplicity. Embodiments of the invention are not restricted to the system given as an example but a person skilled in the art may apply the solution to other communication systems provided with necessary properties.

The user terminal (also called UE, user equipment, user device, terminal device, etc.) illustrates one type of an apparatus to which resources on the air interface are allocated and assigned, and thus any feature described herein with a user device may be implemented with a corresponding apparatus, such as a relay node.

The user terminal typically refers to a portable computing device that includes wireless mobile communication devices operating with or without a subscriber identification module (SIM), including, but not limited to, the following types of devices: a mobile station (mobile phone), smartphone, personal digital assistant (PDA), device using a wireless modem (alarm or measurement device, etc.), laptop and/or touch screen computer, tablet, game console, notebook, and multimedia device. It should be appreciated that a user terminal may also be a nearly exclusive uplink only device, of which an example is a camera or video camera loading images or video clips to a network. A user terminal may also be a device having capability to operate in Internet of Things (IoT) network which is a scenario in which objects are provided with the ability to transfer data over a network without requiring human-to-human or human-to-computer interaction. The user terminal may also utilise cloud. In some applications, a user terminal may comprise a small portable device with radio parts (such as a watch, earphones or eyeglasses) and the computation is carried out in the cloud. The user terminal may be configured to perform one or more of user equipment functionalities. The user terminal may also be called a subscriber unit, mobile station, remote terminal, access terminal, or user equipment (UE) just to mention but a few names or apparatuses. The user terminal may also comprise more than one separate physical units which, however, operate as one logical entity.

Additionally, although the apparatuses have been depicted as single entities, different units, processors and/or memory units (not all shown in FIG. 1) may be implemented.

If the user terminal moves, as often is the case, it may perform handovers from one base station to another. This applies to both radio connections 102, 104. One problem associated with radio connections and hybrid access is that handovers typically lead to a brief interruption in the data flow on the connection. In many cases this interruption is not significant but in some low latency services even brief interruptions are not acceptable.

Figure 2:
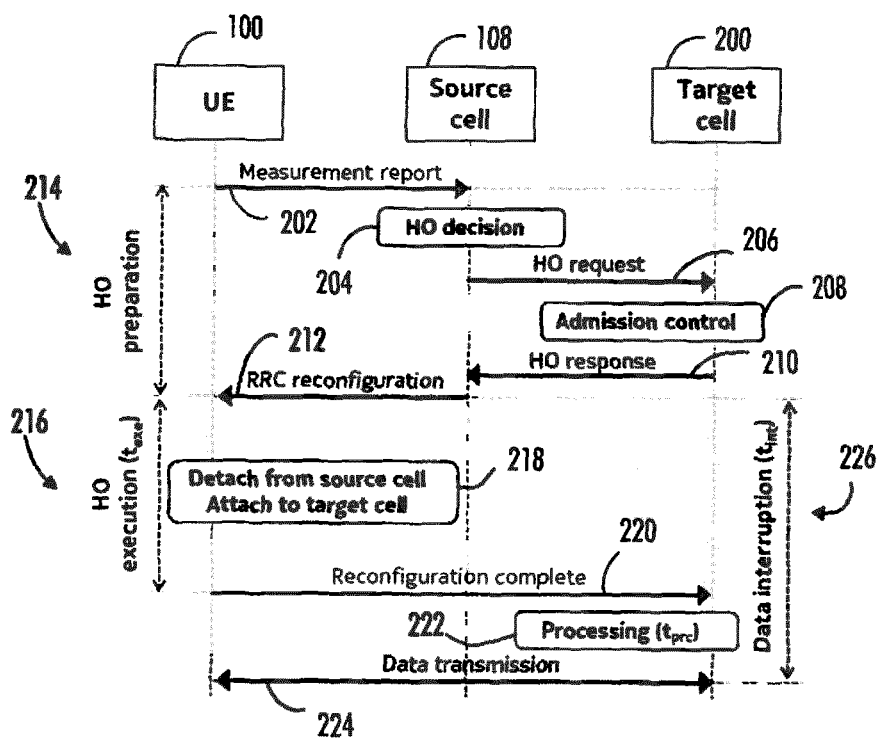
FIG. 2 illustrates a handover procedure in LTE based systems.

The example of FIG. 2 illustrates a handover procedure in LTE based systems. The figure illustrates user terminal 100 performing a handover from a source cell base station 108 to a target cell base station 200. The user terminal sends a measurement report 202 to the source cell. Measurement reports relate to signal strengths or quality of different cells measured by the user terminal. Based on the measurement reports the source cell is configured to determine 204 whether the user terminal should make a handover to another cell. In this case the source cell determines that a handover should be made to the target cell base station 200. The source cell transmits a handover request 206 to the target cell. The target cell decides 208 that it allows the handover and transmits a handover response 210 to the source cell. The source cell transmits a Radio Resource Control (RRC) reconfiguration message 212 to the user terminal. This ends the handover preparation phase 214 and initiates handover execution phase 216. At the same time starts interruption 226 in data traffic of the user terminal.

The user terminal detaches itself from the source cell and attaches 218 to the target cell. After the attachment the user terminal transmits a an RRC reconfiguration complete message 220 to the target cell. After the target cell has processed 222 the message the data traffic 224 of the user terminal may resume.

Measurements have shown that the average duration of the handover execution phase 216 is 25 to 40 milliseconds and the processing 222 takes currently about 10 milliseconds.

One problem related to hybrid access is that the handovers of the different connections of the hybrid access may overlap and thus interruptions in data traffic of the user terminal occur.

The flowchart of FIG. 3 illustrates an example of an embodiment in an apparatus. The apparatus may be a user terminal, for example.

In step 300, the apparatus controls more than one wireless interfaces configured to maintain more than one radio connection connecting the apparatus to one or more networks, where the radio connections are related to a same service. The connections may be to a same network of a given operator or they may be to different networks maintained by different operators. The connections may use the same of different radio technology. For example, on connection may be an LTE connection and another a UTRAN or E-UTRAN connection.

In step 302, the apparatus is configured to control timing of handovers of the different radio connections to execute non overlapping handovers in time. Thus, to ensure that the data traffic of a user terminal is as free of interruptions as possible, in an embodiment the timing of handovers of the different radio connections is controlled be at different time instants.

The flowchart of FIG. 4A and signalling chart of FIG. 4B illustrate an example of an embodiment. As mentioned above, in some communication systems such as in LTE-based systems, handovers are terminal-assisted in the sense that the serving cell relies on a measurement reports received from user terminals to trigger a handover.

In step 400, the user terminal apparatus determines or detects that a handover is being performed on one of the maintained connections.

In step 402, the user terminal apparatus is configured to control timing the transmission to network of a measurement report related to another one of the connections.

Thus a user terminal, which is in a handover on one wireless interface, will postpone the transmission of new measurement reports for another wireless interface for a given number of milliseconds. This will with high likelihood prevent overlapping handovers. The optimal setting of the delay may be estimated by the terminal by observing the handovers in the network over time. Specifically, the device may record the time between sending a measurement report and until receiving an RRC Connection Reconfiguration message, and the duration of the handover execution phase. Thus, the outage due to handovers may be controlled to fulfil desired requirements.

The signalling chart of FIG. 4B illustrates this embodiment. In this example the user terminal apparatus 100 maintains a connection to at least two base stations 108, 430, and the connections are relates to a same service. The user terminal 100 sends a measurement report 410 to the base station 108 it is connected to. The base station 108 determines 412 that the terminal is to perform a handover to a base station of another cell 432 and transmits a handover command 414 to the user terminal. While the user terminal is detaching from the base station 108 and attaching 416 to the new base station 432, the user terminal is configured to delay 418 the transmission of a measurement report to the other base station 430 the user terminal is connected to. Thus, while there is a data traffic interruption on one connection the other connection stays operable without any interruptions due to handovers. When the detaching and attaching procedure 416 has ended the user terminal transmits 420 the delayed measurement report to the base station 430. The user terminal transmits also a RRC reconfiguration complete message 422 to the new base station 432 to which a handover was made. On the basis of the measurement report the base station 430 may make a handover decision regarding the user terminal and transmit a handover command 426 to the user terminal. At this point of time, the other connection to the new base station 432 is operable and data traffic 428 is ongoing. Thus, a possible handover from base station 430 will not cause interruptions in data traffic.

Figure 5:
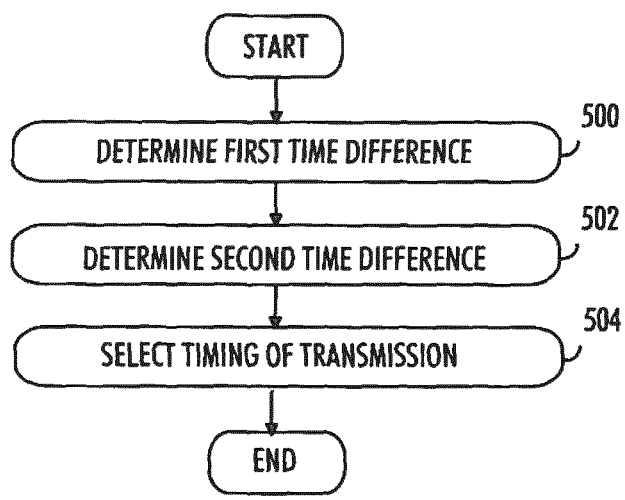
FIG. 5 is a flowchart illustrating an example embodiment.

FIG. 5 is a flowchart illustrating an example of estimating the length of a suitable delay for the transmission on the measurement report. The optimal setting of the delay may be estimated by the terminal by observing the handovers in the network over time.

In step 500, the terminal apparatus is configured to determine the first time difference between transmission time of a measurement report and receiving a handover initiation command from the network. Referring to FIG. 2, the first time difference is between messages 202 and 212, thus measuring the time taken by the handover preparation 214.

In step 502, the terminal apparatus is configured to determine the second time difference between duration of the reception of a handover initiation command and completion of the handover. Referring to FIG. 2, the second time difference is between messages 212 and 220, thus measuring the time taken by the handover execution phase 216.

In step 504, the terminal apparatus is configured to select the timing of a transmission to network of a measurement report on the basis of the first and second time differences. Thus, for example, the delay may be selected to be the sum of the first and second time differences. Other values may be also selected.

In above described embodiments, the user terminal has been controlling the timing of the handovers without specific support from the network side. In some embodiments, the network side may take part in controlling the timing of handovers.

Figure 6:
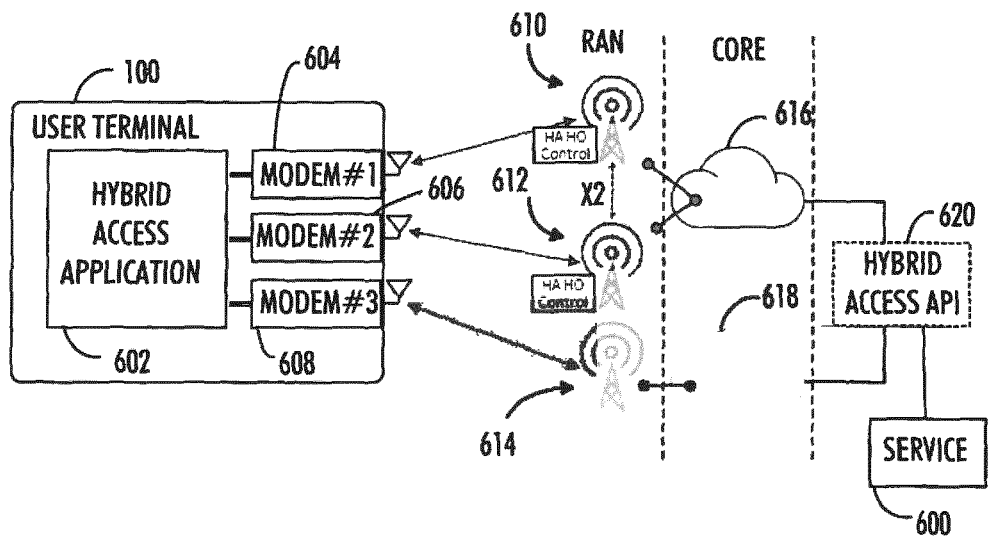
FIG. 6 illustrates an example where a user terminal is utilising a service via networks of one or more operators.

FIG. 6 illustrates a situation where user terminal 100 is utilising a service 600 which requires very low level latency. The user terminal may comprise a hybrid access application 602, which is responsible for controlling hybrid access from the user terminal point of view. The user terminal may further comprise more than one modems 604, 606, 608, which may control a connection to a set of base stations (or remote radio heads in some embodiments) 610, 612, 614. Some of the base stations 610, 612 may belong to a first operator A 616 and some 614 to a second operator B 618. In some embodiments, there may be a hybrid access application program interface, or Hybrid Access API 620 connected to different operators and enabling the use of hybrid access on the network side. In some embodiments, the Hybrid Access API 620 may be an application running on a server in the Internet.

Let us first study a case where the user terminal is connected to the service 600 via the base stations of a single operator. In this example there are two wireless interfaces or connections controlled by modems 604, 606 that are grouped for the service 600. Other possible connections of the user terminal are not affected or taken into account. Since the wireless interfaces are all subscribed to the same mobile network operator, the affiliation to the single end-user can be managed with low complexity e.g. during the subscription phase. The base stations 610, 612 the modems 604, 606 are connected may vary at any given time.

In an embodiment, different Radio Resource Control, RRC, configuration and handover settings may be applied for the different wireless interfaces. For example, the time-to-trigger the measurement report (detecting that a neighbour cell becomes an offset better than the serving cell) can be set to a high and a low value for two grouped interfaces. Thus, one interface will have a tendency to conduct its handover earlier than the other.

This method is transparent to the radio network except at RRC layer. Different configurations may be applied and installed in each of the wireless interfaces. It can work across different radio technologies as well although configuration parameters are not necessarily the same.

In an embodiment, for each of the radio connections, a given time window for a possible handover may be applied, where the time windows of different radio connections are non-overlapping.

For example, different time instances for allowing handover may be preconfigured. As an example, assuming modems 604 and 606 are in use, modem 604 may be allowed only to perform handover during 50% of the time, while modem 606 may be allowed the other 50% of the time. The alternating handover instances could happen every 100 ms, for example. Guard times can be added as it is not 100% predictable how long a handover will take.

This method is transparent to the radio network except at RRC layer. It can work across different radio technologies as well. The handover opportunities can become limited if considerable guard times may be needed.

In an embodiment, when the wireless interfaces or connections are with one operator network, it is possible to have different radio Resource Management, RRM, control that is aware of that the wireless interfaces or connections are grouped for the service 600. When the two interfaces are connected to the same cell and base station, the base station may ensure that handover of one wireless interface does not overlap with a handover of the second wireless interface. This method may be extended to multiple cells (and base stations) provided control messages are exchanged (for example utilising the X2 interface or other interfaces between base stations), in such a manner that two or more different base stations handling the group of wireless devices may coordinate handovers of the interfaces or connections so that the handovers will not take place for all wireless interfaces simultaneously.

In this method, group RRM control may take into account other reliability factors of the network while deciding which interfaces would handover first.

In the current LTE standard, it is not possible for the user terminal or the service provider involved in a hybrid access implementation to provide information related to a potential hybrid access group of wireless interfaces to the network. However, when there are multiple operators involved in hybrid access, as operators A 616 and operator B 618 in FIG. 6, this information is need to ensure the non-overlapping handovers. In an embodiment, a Hybrid Access API 620 may be utilised to transmit information to each of the mobile network operators.

Figure 7:
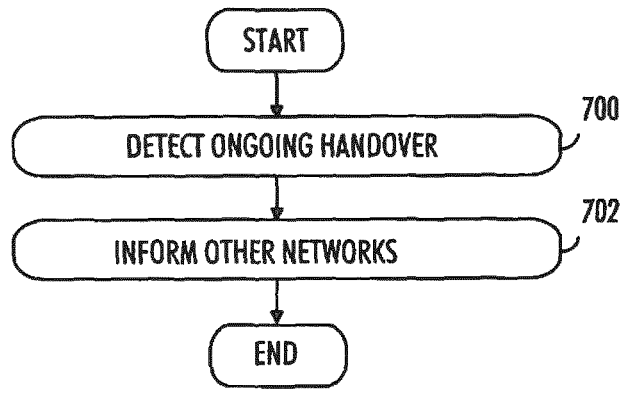
FIG. 7 is a flowchart illustrating an example embodiment.

Flowchart of FIG. 7 illustrates an example embodiment. In an embodiment, the user terminal 100 or the Hybrid Access API 620 may detect 700 that the user terminal is performing a handover on a wireless interface connected to an operator's network. The user terminal 100 or the Hybrid Access API 620 may be configured to inform 702 other networks the user terminals wireless interfaces are connected to that the user terminal is currently performing a handover on another operators' network. Therefore, any other imminent handovers should be postponed. It may be specified what time is should postpone (e.g. x milliseconds) or there could be a "handover completed" signal transmitted by the user terminal 100 or the Hybrid Access API 620. In an embodiment, similar to one operator case, time restrictions regarding handovers can also be agreed between the different operator networks.

As user terminal 100 is aware of its handover situation (from monitoring its wireless interfaces) is may thus inform the another network 616 directly via the hybrid access application 602 if a wireless interface connected to another network 618 is initiating handover and request that handovers are not performed in the near future. Alternatively, the user terminal may communicate its handover status to the network-side hybrid access API 620 which can then communicate with the networks instead.

In an embodiment, one of the networks the user terminal is connected to may inform user terminal the hybrid access application 602 that handovers are imminent. The hybrid access application may then respond with "OK" or "wait X seconds"/"wait until I accept", for example.

Figure 8:
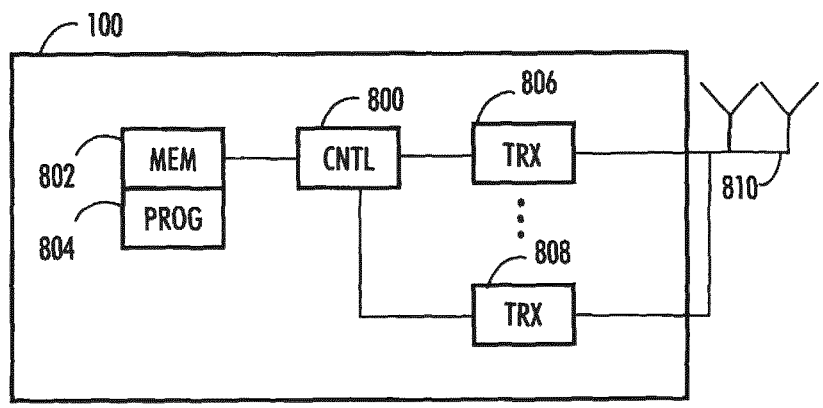
FIGS. 8 and 9 illustrate simplified examples apparatuses in which some embodiments of the invention may be applied.

FIG. 8 illustrates an embodiment. The figure illustrates a simplified example of an apparatus 100 in which embodiments of the invention may be applied. In some embodiments, the apparatus may be a user terminal, for example.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. For example, the apparatus may be realized using cloud computing or distributed computing with several physical entities located in different places but connected with each other.

The apparatus of the example includes a control circuitry 800 configured to control at least part of the operation of the apparatus.

The apparatus may comprise a memory 802 for storing data. Furthermore the memory may store software or applications 804 executable by the control circuitry 800. The memory may be integrated in the control circuitry.

The control circuitry 800 is configured to execute one or more applications. The applications may be stored in the memory 802.

The apparatus may further comprise one or more wireless interfaces 806, 808 operationally connected to the control circuitry 800. The wireless interfaces may be connected to one or more set of antennas 810.

In an embodiment, the applications 804 stored in the memory 802 executable by the control circuitry 800 may cause the apparatus to perform the embodiments described above.

Figure 9:
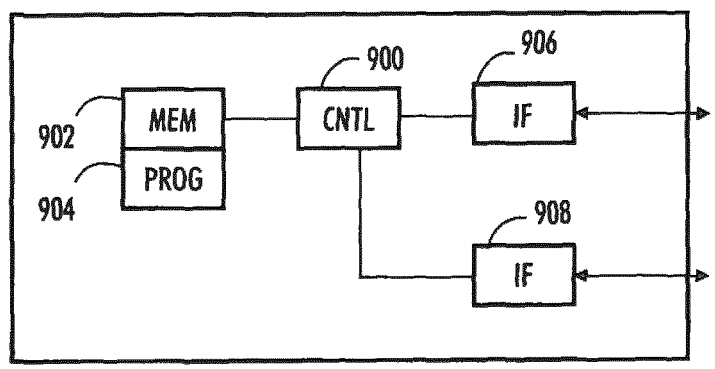

FIG. 9 illustrates an embodiment. The figure illustrates a simplified example of a network element controlling a user terminal, in which apparatus embodiments of the invention may be applied. In some embodiments, the apparatus may be a server of a network, or a server connected to more than one networks, or a base station, for example.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities. For example, the apparatus may be realized using cloud computing or distributed computing with several physical entities located in different places but connected with each other.

The apparatus of the example includes a control circuitry 900 configured to control at least part of the operation of the apparatus.

The apparatus may comprise a memory 902 for storing data. Furthermore the memory may store software or applications 904 executable by the control circuitry 900. The memory may be integrated in the control circuitry.

The control circuitry 900 is configured to execute one or more applications. The applications may be stored in the memory 902.

The apparatus may further comprise one or more interfaces 906, 908 operationally connected to the control circuitry 900. The interfaces may connect the apparatus to one or more networks and to user terminals.

In an embodiment, the applications 904 stored in the memory 902 executable by the control circuitry 900 may cause the apparatus to perform the embodiments described above.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

In an embodiment, an apparatus comprises means for controlling more than one wireless interfaces configured to maintain more than one radio connection connecting the apparatus to one or more networks, the more than one radio connection being related to a same service and means for controlling timing of handovers of the different radio connections to execute non overlapping handovers in time.

In an embodiment, an apparatus comprises means for detecting that a user terminal controls more than one wireless interfaces configured to maintain more than one radio connection, the more than one radio connection being related to a same service; and means for controlling the handover related messages transmitted to the user terminal to control timing of handovers of the different radio connections to execute non overlapping handovers in time.

It will be obvious to a person skilled in the art that, as the technology advances, the inventive concept can be implemented in various ways. The invention and its embodiments are not limited to the examples described above but may vary within the scope of the claims.

The invention claimed is:
1. An apparatus, comprising:
at least one processor; and
at least one memory including computer program code;
the at least one memory and the computer program code configured to, with the at least one processor, cause the apparatus at least to:
control more than one wireless interfaces configured to maintain more than one radio connection connecting the apparatus to one or more networks, the more than one radio connection being related to the same service;
control timing of handovers of the different radio connections to execute non overlapping handovers in time;

detect that a handover is being performed on one of the maintained connections;

control timing of a transmission to network of a measurement report related to another one of the connections;

determine the first time difference between transmission time of a measurement report and receiving a handover initiation command from the network;

determine the second time difference between duration of the reception of a handover initiation command and completion of the handover, and select the timing of a transmission to network of a measurement report on the basis of the first and second time differences.

2. The apparatus of claim 1, the at least one memory and the computer program code configured to, with the at least one processor, cause the apparatus further to:

apply different radio resource control configuration and handover setting for each of the more than one radio connection.

3. The apparatus of claim 1, the at least one memory and the computer program code configured to, with the at least one processor, cause the apparatus further to:

for each of the more than one radio connection, apply a given time window for a possible handover, where time windows of different radio connections are non-overlapping.

4. The apparatus of claim 1, the at least one memory and the computer program code configured to, with the at least one processor, cause the apparatus further to:

detect that a handover is being performed on one of the maintained connections; and inform the networks the other maintained radio connections are connected to about the ongoing handover.

5. A network element, comprising:

at least one processor; and at least one memory including computer program code;

the at least one memory and the computer program code configured to, with the at least one processor, cause the apparatus at least to perform:

detect that a user terminal controls more than one wireless interfaces configured to maintain more than one radio connection, the more than one radio connection being related to the same service;

control the handover related messages transmitted to the user terminal to control timing of handovers of the different radio connections to execute non overlapping handovers in time; and receive a measurement report from the user terminal, wherein the measurement report from the user terminal has a timing of transmission to the network element on the basis of a first time difference between transmission time of a measurement report and receiving a handover initiation command from the network and on the basis of a second time difference between duration of the reception of a handover initiation command and completion of the handover.

6. The apparatus of claim 5, the at least one memory and the computer program code configured to, with the at least one processor, cause the apparatus further to:

command each of the more than one radio connection to apply a given time window for a possible handover, where time windows of different radio connections are non-overlapping.

7. The apparatus of claim 5, the at least one memory and the computer program code configured to, with the at least one processor, cause the apparatus further to:

transmit the user terminal a command to apply different radio resource control configuration and handover setting for each of the more than one radio connection.

8. A method in a user terminal, said method comprising:

controlling more than one wireless interfaces configured to maintain more than one radio connection connecting the apparatus to one or more networks, the more than one radio connection being related to the same service;

controlling timing of handovers of the different radio connections to execute non overlapping handovers in time;

detecting that a handover is being performed on one of the maintained connections;

controlling timing of a transmission to network of a measurement report related to another one of the connections;

determining the first time difference between transmission time of a measurement report and receiving a handover initiation command from the network;

determining the second time difference between duration of the reception of a handover initiation command and completion of the handover, and selecting the timing of a transmission to network of a measurement report on the basis of the first and second time differences.

9. The method of claim 8, further comprising:

applying different radio resource control configuration and handover setting for each of the more than one radio connection.

10. The method of claim 8, further comprising:

applying, for each of the more than one radio connection, a given time window for a possible handover, where time windows of different radio connections are non-overlapping.

11. The method of claim 8, further comprising:

detecting that a handover is being performed on one of the maintained connections; and informing the networks the other radio connections are connected to about the ongoing handover.

12. A method in a network element controlling a user terminal, comprising:

detecting that a user terminal controls more than one wireless interfaces configured to maintain more than one radio connection, the more than one radio connection being related to the same service; and controlling the handover related messages transmitted to the user terminal to control timing of handovers of the different radio connections to execute non overlapping handovers in time; and receiving a measurement report from the user terminal, wherein the measurement report from the user terminal has a timing of transmission to the network element on the basis of a first time difference between transmission time of a measurement report and receiving a handover initiation command from the network and on the basis of a second time difference between duration of the reception of a handover initiation command and completion of the handover.

13. The method of claim 12, further comprising:

commanding each of the more than one radio connection to apply a given time window for a possible handover, where time windows of different radio connections are non-overlapping.

14. The method of claim 12, further comprising:
transmitting the user terminal a command to apply different radio resource control configuration and handover setting for each of the more than one radio connection.

15. A computer program embodied on a non-transitory computer-readable medium, said computer program comprising instructions for causing an apparatus to perform at least:
controlling more than one wireless interfaces configured to maintain more than one radio connection connecting the apparatus to one or more networks, the more than one radio connection being related to the same service;
controlling timing of handovers of the different radio connections to execute non overlapping handovers in time;
detecting that a handover is being performed on one of the maintained connections;
controlling timing of a transmission to network of a measurement report related to another one of the connections;
determining the first time difference between transmission time of a measurement report and receiving a handover initiation command from the network;
determining the second time difference between duration of the reception of a handover initiation command and completion of the handover; and
selecting the timing of a transmission to network of a measurement report on the basis of the first and second time differences.

16. A computer program embodied on non-transitory computer-readable medium, said computer program comprising instructions for causing an apparatus to perform at least:
controlling more than one wireless interfaces configured to maintain more than one radio connection connecting the apparatus to one or more networks, the more than one radio connection being related to the same service;
controlling timing of handovers of the different radio connections to execute non overlapping handovers in time; and
receiving a measurement report from the user terminal, wherein the measurement report from the user terminal has a timing of transmission to the network element on the basis of a first time difference between transmission time of a measurement report and receiving a handover initiation command from the network and on the basis of a second time difference between duration of the reception of a handover initiation command and completion of the handover.

* * * * *